United States Patent
Hesselmans et al.

(10) Patent No.: US 8,969,471 B2
(45) Date of Patent: Mar. 3, 2015

(54) PROCESS FOR THE PREPARATION OF DISPERSIONS OF CROSS-LINKING AGENTS IN WATER

(75) Inventors: Laurentius Cornelis Josephus Hesselmans, GN'-Hertogenbosch (NL); Marthe Hesselmans, Utrecht (NL); Andries Johannes Derksen, Nijmegen (NL)

(73) Assignee: Stahl International B.V., Waalwijk (NL)

( * ) Notice: Subject to any disclaimer, the term of this patent is extended or adjusted under 35 U.S.C. 154(b) by 1409 days.

(21) Appl. No.: 12/278,275

(22) PCT Filed: Jan. 10, 2007

(86) PCT No.: PCT/NL2007/050007
§ 371 (c)(1),
(2), (4) Date: Oct. 1, 2009

(87) PCT Pub. No.: WO2007/089142
PCT Pub. Date: Aug. 9, 2007

(65) Prior Publication Data
US 2010/0076153 A1    Mar. 25, 2010

(30) Foreign Application Priority Data
Feb. 2, 2006    (NL) .................................. 1031053

(51) Int. Cl.
| | |
|---|---|
| C08L 83/00 | (2006.01) |
| C08L 83/04 | (2006.01) |
| C08G 18/08 | (2006.01) |
| C08L 75/00 | (2006.01) |
| C08G 18/28 | (2006.01) |
| C08K 3/20 | (2006.01) |
| C07C 251/00 | (2006.01) |
| C07C 249/00 | (2006.01) |
| C07C 257/00 | (2006.01) |
| C07C 263/00 | (2006.01) |
| C07C 265/00 | (2006.01) |
| C07C 267/00 | (2006.01) |
| C07C 291/00 | (2006.01) |
| B32B 5/02 | (2006.01) |
| B32B 27/04 | (2006.01) |
| B32B 27/12 | (2006.01) |
| C08G 18/02 | (2006.01) |
| C08G 18/70 | (2006.01) |
| C08G 18/71 | (2006.01) |
| C08G 18/75 | (2006.01) |
| C09D 175/04 | (2006.01) |

(52) U.S. Cl.
CPC .......... *C08G 18/025* (2013.01); *C08G 18/2825* (2013.01); *C08G 18/283* (2013.01); *C08G 18/2885* (2013.01); *C08G 18/289* (2013.01); *C08G 18/706* (2013.01); *C08G 18/71* (2013.01); *C08G 18/758* (2013.01); *C09D 175/04* (2013.01)
USPC ........... 524/591; 524/588; 524/589; 524/590; 560/334; 560/336; 560/351; 560/355; 442/82

(58) Field of Classification Search
CPC ............. C08G 18/025; C08G 18/2825; C08G 18/289; C08G 18/758; C08G 18/2885; C08G 18/283; C08G 18/71; C08G 18/706; C09D 175/04
USPC .......... 560/334, 336, 351, 355; 524/588, 589, 524/590, 591; 442/82
See application file for complete search history.

(56) References Cited

U.S. PATENT DOCUMENTS

| | | | | |
|---|---|---|---|---|
| 4,088,665 | A | * | 5/1978 | Findeisen et al. ............. 560/334 |
| 5,258,481 | A | * | 11/1993 | Hesselmans et al. ........... 528/28 |
| 5,321,101 | A | * | 6/1994 | Suzuki et al. ................. 525/452 |
| 2004/0077238 | A1 | * | 4/2004 | Audenaert et al. .............. 442/82 |

FOREIGN PATENT DOCUMENTS

| | | | |
|---|---|---|---|
| EP | 0241805 | | 10/1987 |
| WO | WO03100157 | * 12/2003 | .......... D06M 15/576 |
| WO | WO-2005/003204 | | 1/2005 |
| WO | WO2005003204 | * 1/2005 | ............. C08G 18/02 |

OTHER PUBLICATIONS

Wicks et al. Progress in Organic Coatings 36 1999 pp. 148-172.*

* cited by examiner

*Primary Examiner* — Patrick Ryan
*Assistant Examiner* — Aaron Greso
(74) *Attorney, Agent, or Firm* — Peacock Myers, P.C.; Jeffrey D. Myers

(57) ABSTRACT

A process for the preparation of stable aqueous polycarbodiimide dispersions to be used as cross-linking agents, in which initially an isocyanate functional polycarbodiimide is prepared from a polyisocyanate and a mono- or polyisocyanate which contains a hydrophobic group. Thereafter the polycarbodiimide chain is capped and/or extended by reaction of the isocyanate functions or a part thereof with a hydrophilic amine- or hydroxy functional compound and of the remaining isocyanate functions with an amine- or hydroxy functional compound which contains hydrophobic groups, after which the obtained product is dispersed in water and the pH is adjusted to 9-14. The hydrophobic groups are hydrocarbons with 4-25 carbon atoms, fluorinated hydrocarbons, silicone functional hydrocarbons or polysilicones. Further, the invention relates to a coating mixture in which the polycarbodiimide dispersion is used as cross-linking agent and to the cured material obtained with the coating mixture.

25 Claims, No Drawings

PROCESS FOR THE PREPARATION OF DISPERSIONS OF CROSS-LINKING AGENTS IN WATER

CROSS-REFERENCE TO PRIOR APPLICATION

This is a United States National Phase Application under 35 U.S.C. §371 of International Patent Application No. PCT/NL2007/050007 filed Jan. 10, 2007 which claims the benefit of Dutch Patent Application No. 1031053 filed Feb. 2, 2006, both of which are incorporated by reference herein in their entireties. International Patent Application No. PCT/NL2007/050007 was published on Aug. 9, 2007, as WO 2007/089142 A1 under PCT Article 21(2).

Polycarbodiimides are well known cross-linking agents for aqueous polymers containing carboxylic acid functions.

A review of the development of the preparation and the application of polycarbodiimides is described in WO 2005/003204.

The patent application concerned describes the development of polycarbodiimide dispersions in water, which are stabilized at a high pH by the addition of a base or a buffer.

However, when using this process, the mean number of carbodiimide functions in the molecules in the polymer is limited, because the viscosity of the reaction mixture increases strongly when the polycarbodiimide chain is extra lengthened by increasing the reaction time in the first stage of the preparation. Hence, mixing of the intermediate isocyanate functional polycarbodiimide will be hard, just as mixing of the intermediate product containing hydrophilic functions, which is formed later. Therefore it is difficult to disperse this intermediate in water.

The object of the present invention is to provide a process in which the disadvantages mentioned above are eliminated effectively.

DESCRIPTION OF THE INVENTION

According to the present invention there is provided a process for the preparation of stable aqueous polycarbodiimide dispersions to be used as cross-linking agents, characterized by:
  reacting a polyisocyanate at 120-180° C. in the presence of 0.5-5% of a carbodiimide catalyst, to form an isocyanate functional polycarbodiimide, with a mean value of 1-10 carbodiimide functions and which contains 5-30% by weight of a mono- or polyisocyanate with a hydrophobic group and which mono- or polyisocyanate contributes to the formation of the isocyanate functional polycarbodiimide, and in which the hydrophobic group is a hydrocarbon containing 4-25 carbon atoms, a fluorinated hydrocarbon, a silicone functional hydrocarbon or a polysilicone,
  terminating and/or chain extending the isocyanate functional polycarbodiimide chain by the addition of 0.1 to 1.0 equivalent, with respect to the isocyanate functions, of a compound containing a hydrophilic group and one or more amine and/or hydroxy functions, together with, or followed by capping of the remaining isocyanate functions with a compound containing one or more amine and/or hydroxy functions and optionally a hydrophobic group, in which the hydrophobic group is a hydrocarbon containing 4-25 carbon atoms, a fluorinated hydrocarbon, a silicone functional hydrocarbon or a polysilicone,
  dispersion of the resulting compound in water
  adjusting the pH of the formed dispersion to 9-14 by the addition of a base or a buffer during or after the dispersion in water.

The number of carbodiimide functions in the polycarbodiimide chain can be selected by monitoring the first reaction step. The remaining amount of isocyanate after the first reaction step is a measure for this number.

A polycarbodiimide chain with fewer functions is obtained by using a shorter reaction time and a polycarbodiimide chain with more functions is obtained by using a longer reaction time.

The polycarbodiimide dispersion contains 0-25% of an organic solvent which is non-reactive towards the polycarbodiimide. Examples are N-methyl-pyrrolidinone, N-ethylpyrrolydinone, dipropyleneglycol dimethylether, diethyleneglycol dimethylether, methoxypropyl acetate. For environmental reasons it is preferred that the dispersion contains no organic solvent at all.

When the hydrophobic group of the mono- or diisocyanate, or of the compound containing one or more amine and/or hydroxy functions is a hydrocarbon, this compound contains preferably 6 tot 20 carbon atoms.

The capping of the isocyanate functional polycarbodiimide chain with a hydroxy functional compound occurs at conventional conditions at a temperature between 50 and 120° C. and optionally a conventional catalyst such as an organic tin, aluminium, bismuth, zirconium, zinc, or nickel compound or complex and/or a tertiary amine functional compound. The capping with an amine functional compound occurs also under conventional conditions and a temperature between 0 and 60° C. is used. Further, the amine functional compound may be added partially or entirely after the dispersion in the aqueous phase.

Surprisingly, the viscosity of the isocyanate functional polycarbodiimide and of the subsequently formed terminated or chain extended intermediate product prepared during the process, appeared to be lower than the viscosity of the corresponding intermediate products with a similar amount of carbodiimide functions as were formed during a process without compounds containing hydrophobic functions, which process is described in WO 2005/003204. Because of this reason, even polycarbodiimides with more functions can be prepared. A second effect of lengthening of the polycarbodiimide chain is that the mean carbodiimide concentration increases, since the contribution of the molecular weight of the terminal group will be diminished.

A further advantage is that the product will have emulsifying properties because of the combination of hydrophobic and hydrophilic material in one compound. Compared to former developments less hydrophilic material is shown to be required for the dispersion of the polycarbodiimide and after application of the polycarbodiimide as cross-linking agent the dried film or coating is less sensitive to water.

A further advantage is that after application of the polycarbodiimide as cross-linking agent in polyurethanes, the obtained film or coating is more solvent-resistant and behaves better in a wet-rubbing test. Finally, a higher cross-linking density is obtained.

A hydrophobic group in the polycarbodiimide, which contains fluorinated hydrocarbons, contributes to an anti-soiling effect and to a more hydrophobic character of the cross-linked film or coating.

A hydrophobic group in de polycarbodiimide, which contains silicone functions, contributes to a better flow-behaviour of the application mixture, to a more hydrophobic character and to a better feel of the cross-linked film or coating.

There are several options for the composition of the mono and/or diisocyanate, which may be used in the process.

The mono-isocyanate containing a hydrophobic group may be an isocyanate containing a linear or branched alkyl, alkylene, alkyl-aryl or alkylene-aryl group with 4-25 carbon atoms. For example it may be an alkyl, cycloalkyl, alkyl-aryl, or arylalkyl functional isocyanate, such as butylisocyanate, hexylisocyanate, octylisocyanate, undecylisocyanate, dodecylisocyanate, hexadecylisocyanate, octadecylisocyanate, cyclohexylisocyanate, phenylisocyanate, tolylisocyanate, 2-heptyl-3,4-bis(9-isocyanatononyl)-1-pentylcyclohexane.

A further option is that the mono-isocyanate and/or polyisocyanate is the adduct of a polyisocyanate and a hydroxy- or amine functional compound with a linear or branched alkyl, alkylene, alkyl-aryl or alkylene-aryl group with 4-25 carbon atoms.

A further option is that the mono-isocyanate containing a hydrophobic group is an isocyanate containing an alkyl, an alkylene, an alkyl-aryl or an alkylene-aryl group which contains 1-50 fluorine atoms. Examples of these are fluorphenylisocyanate, fluortolylisocyanate, fluortolyl, 3-(trifluormethyl)phenylisocyanate.

A further option is that the mono-isocyanate and/or polyisocyanate is the adduct of a polyisocyanate and a hydroxy- or amine functional compound with an alkyl, an alkylene, an alkyl-aryl or an alkylene-aryl group containing 1-50 fluorine atoms.

A further option is that the mono-isocyanate and/or polyisocyanate is the adduct of a polyisocyanate and a hydroxy- or amine functional silicone, an hydroxyalkyl- or an aminoalkyl functional silicone.

Termination or chain extension of the isocyanate-functional carbodiimide with the compound containing an hydrophilic group and one or more amine and/or hydroxy functions and with the compound containing one or more amine and/or hydroxy functions and no hydrophilic groups, can be executed during the formation of the polycarbodiimide at 120-180° C., after the formation of the polycarbodiimide at 0-120° C., or after the dispersion in water at 0-60° C.

The pH of the polycarbodiimide dispersion is preferably adjusted between 11 and 13 with the objective to obtain a stable dispersion. The carbodiimide catalyst used in the process may be any conventional carbodiimide catalyst, but preferably 1-methylphospholene-1-oxide is used.

The polyisocyanate which is used for the preparation of the polycarbodiimide is toluene-2,4-diisocyanate, toluene-2,6-diisocyanate and mixtures thereof, is diphenylmethane-4,4-diisocyanate, 1,4-phenylenediisocyanate, dicyclohexylmethane-4,4'-diisocyanate, 3-isocyanatomethyl-3,5,5-trimethylcyclohexylisocyanate, 1,6-hexyldiisocyanate, 1,4-cyclohexyldiisocyanate, norbonyldiisocyanate, or a mixture thereof and is preferably dicyclohexylmethaan-4,4'-diisocyanate.

The function of the base which is used in the last step of the process is to stabilize the dispersion. It is an alkali-hydroxide, for example lithium hydroxide, sodium hydroxide or potassium hydroxide, or a trialkylamine, or a trialkylamine containing hydroxy functions.

A further option is that said base, or part of it, is incorporated in the polycarbodiimide chain by capping the polycarbodiimide chain with a dialkylamino-alkylamine or alcohol, and/or by the addition of 0.01 to 0.3 equivalents, with respect to the polyisocyanate, of a tertiary amine containing polyol or polyamine during or after the formation of the polycarbodiimide.

As alternative for the base a buffer may be used to adjust the pH-value to the desired value and to keep it at that level. Buffers which are effective in the pH range between 9 and 14 are convenient for that purpose. Examples are a phosphate, carbonate, tris(hydroxymethyl)-aminomethane-buffer or an amino-alkylsulfonic acid buffer.

The compound containing an hydrophilic group and one or more amine and/or hydroxy functions is a polyethoxy mono- or diol, a polyethoxy/polypropoxy mono- or diol, a polyethoxy mono- or diamine, a polyethoxy/polypropoxy mono- or diamine, a diol or diamine containing a pendant polyalkoxy chain, an hydroxy- or amine alkylsulfonate, or a dialkylamino-alkyl-alcohol or amine, or a mixture thereof, which compound has a molecular weight between 100 and 6000 and preferably between 200 and 2000.

In a similar way as described in WO 2005/003204, 0.01 to 0.30 equivalents of a mono- or polyol or a mono- or polyamine, with respect to the polyisocyanates, can be added before, during or after the formation of the polycarbodiimide, which polyol or polyamine is for example a mono or polyhydroxyalkane, a polyether mono- or polyol, a polyester polyol, a polycarbonate polyol, a polycaprolactam polyol, a mono- or polyamino-alkane, a polyether mono- or polyamine. As described in WO 2005/003204, the purpose is to increase the distance between the cross-linking functions.

A conventional non-ionic, anionic or cationic emulsifier may be used during the dispersion in water of the capped or chain-extended compound.

The invention further relates to a coating mixture comprising the polycarbodiimide dispersion as cross-linking agent and a polymer dispersed in water, which polymer contains carboxylic acid functions and which may contain a solvent. Examples of these polymers are polyurethanes, acrylate or methacrylate polymers or copolymers, polyvinylacetates, latexes.

Further, the coating mixture may contain solvents or conventional additives, such as emulsifiers, colorants, pigments, wetting agents, levelling agents, silicones, fillers, plasticizers, matting agents.

Finally the invention extends to the cured material which is obtained by applying the coating mixture to a substrate and evaporation of the water and, if present, the solvent.

Suitable substrates are for example: leather, artificial leather, plastics such as polyurethanes, polyacrylates, polyethylene, polypropylene, PVC or polyester, paper, paper board, textile, non-woven, cloth, foam, wood, glass, metal. The present invention is further illustrated by the following examples to which the invention is however not limited. It goes without saying that numerous other embodiments are possible, all within the protective scope of the present invention.

EXAMPLES

Examples 1-13

The preparation of aqueous dispersions of polycarbodiimides, based on dicyclohexylmethane-4,4'-diisocyanate and octadecylisocyanate.

Under a nitrogen atmosphere a mixture of dicyclohexylmethane-4,4'-diisocyanate (in the following indicated as HMDI), octadecylisocyanate (in the following indicated as ODIC), as indicated in Table A, and 2 g of 1-methylphospholene-1-oxide were heated to 140° C. while stirring and heating was continued until an isocyanate content according to table A was obtained. Then the mixture was cooled to 90-100° C. The reaction time was 8 hrs. Hydroxyl functional compounds were added as indicated in Table A, and the total amount was equimolar with respect to the isocyanate function. Dibutyl tin laureate in an amount of 0.01% by weight of was added as catalyst and the mixtures were reacted further at 90-100° C. until the isocyanate signal in the IR-spectrum had disappeared, which took about 3 hrs. In the case of Example 11 the dimethyl-ethanolamine was added after 1 hr of reaction time. The mixtures were cooled to 60-65° C. and dispersed in water of 60-65° C., while the solids amount was adjusted to 35%. In the case of Example 12 and 13, the amine functional compound was added to the dispersion afterwards and the mixture was stirred for 10 min. A 10% solution of sodium hydroxide was added as shown in Table A until the pH was 11-12. The samples were subjected to a stability test at 50° C. Every 2 weeks the carbodiimide amount was checked. The products were stable for at least 8 weeks at 50° C.

Polycarbodiimide dispersions based on dicyclohexylmethane-4,4'-diisocyanate and capped with PEG-350 (a polyethoxyethanol with a mean molecular weight of 350), as presented in Table B, were prepared according to the method described in WO 2005/003204. These polycarbodiimides contain no additional hydrophobic group. The polyethoxy compounds which are used in these comparative examples have a lower molecular weight than those used in the examples 1-13 to prevent that the final products will contain too much hydrophilic material.

At comparing the viscosities in Examples 14, 15 and 16 with the viscosities in Examples 1, 2 en 3, and in Examples 5 and 6, it appeared that the viscosities in Examples 1, 2 and 3 and in Examples 5 and 6 are much lower than the viscosities

TABLE A

| Example | HMDI[i] (g) | ODIC[j] (g) | Theoretical number carbodiimide functions in Polymer | NCO Amount (%) | Isocyanate reactive compound Reacted with NCO prior to dispersing in water | Added after dispersing water | Amounts (g) | Viscosity of polymer at 30° C. before dispersing in water (cps) |
|---|---|---|---|---|---|---|---|---|
| 1 | 200 | 75 | 3.0 | 4.42 | PEG-750[a]-HDA[b] | | 57-43 | 45000 |
| 2 | 200 | 56 | 4.0 | 3.60 | PEG-750[a]-HDA[b] | | 43-32 | 140000 |
| 3 | 200 | 45 | 5.0 | 3.03 | PEG-750[a]-HDA[b] | | 34-26 | 470000 |
| 4 | 200 | 38 | 6.0 | 2.62 | PEG-750[a]-HDA[b] | | 29-22 | 1700000 |
| 5 | 200 | 117 | 4.0 | 0.99 | PEG-750[a] | | 50 | 44000 |
| 6 | 200 | 86 | 5.0 | 0.96 | PEG-750[a] | | 50 | 88000 |
| 7 | 200 | 67 | 6.0 | 0.96 | PEG-750[a] | | 42 | 500000 |
| 8 | 200 | 56 | 4.0 | 3.60 | PEG-750[a]-HDA[b]-Polyfox[c] | | 42-28-43 | 130000 |
| 9 | 200 | 56 | 4.0 | 3.60 | PEG-750[a]-HDA[b]-Fluorolink[d] | | 42-19-56 | 420000 |
| 10 | 200 | 56 | 4.0 | 3.60 | PEG-750[a]-silicon-mono-ol[e] | | 42-42 | 140000 |
| 11 | 200 | 56 | 4.0 | 3.60 | PEG-750[a]-DMEA[f] | | 42-17 | — |
| 12 | 200 | 56 | 4.0 | 3.60 | PEG-750[a] | MEA[g] | 42-10 | — |
| 13 | 200 | 56 | 4.0 | 3.60 | HDA[b] | Na-taurine[h] | 14-16 | — |

[a]PEG-750 is a polyethoxyethanol with a mean molecular weight of 750
[b]HDA is hexadecyl alcohol
[c]Polyfox is Polyfox AT 1137 C4-mono-ol, a compound with 1 hydroxy function and a fluorinated alkyl function, obtainable from Omnova Solutions
[d]Fluorolink is Fluorolink D, a hydroxy functional perfluorpolyether compound containing a CH₂OH function as isocyanate reactive group, having a mean molecular weight of 1000 and containing 62 weight % fluorine, obtainable from Solvay Solexis
[e]Silicon-mono-ol is Silwet L7608, a compound with 1 hydroxy function and several siloxane functions, obtainable from GE Silicones
[f]DMEA is N-dimethylethanolamine
[g]MEA is methoxyethylamine
[h]Na-taurine is sodium-2-aminoethylsulfonate
[i]HMDI is dicyclohexylmethane-4,4'-diisocyanate
[j]ODIC is octadecylisocyanate

TABLE B

| Example | HMDI[b] (g) | ODIC[c] (g) | Theoretical number carbodiimide functions in Polymer | NCO amount (%) | Isocyanate reactive compound Reacted with NCO prior to dispersing in water | Added after dispersing water | amounts | Viscosity of polymer at 30° C. before dispersing in water (cps) |
|---|---|---|---|---|---|---|---|---|
| 14 | 200 | 0 | 3.0 | 9.08 | PEG-350[a] | — | 133 | 120000 |
| 15 | 200 | 0 | 4.0 | 7.34 | PEG-350[a] | — | 106 | 760000 |
| 16 | 200 | 0 | 5.0 | 6.15 | PEG-350[a] | — | 88 | 3000000 |

[a]PEG-350 is a polyethoxyethanol with a mean molecular weight of 350
[b]HMDI is dicyclohexylmethane-4,4'-diisocyanate
[c]ODIC is octadecylisocyanate.

Examples 14-16

Comparative Examples

The preparation of aqueous dispersions of polycarbodiimides, based on dicyclohexylmethane-4,4'-diisocyanate.

of Examples 14, 15 and 16, while a similar theoretical amount of carbodiimide functions is present in the polymer.

Examples 17-29

The preparation of aqueous dispersions of polycarbodiimides, based on HMDI.

The method of the Examples 1-13 was repeated, with the exception that the water was replaced by a solution of a 0.01 M disodium phosphate buffer. Samples were subjected to a stability test at 50° C. Every 2 weeks the carbodiimide amount was checked. The products were stable for at least 8 weeks at 50° C.

Example 30

Testing of the products of Examples 1, 2, 3, 4, 5, 6, 7 as cross-linking agents in a polyurethane dispersion, with the products of Example 14 and 15 as comparative examples.

6% of the dispersions of Examples 1, 2, 3, 4, 5, 6, 7 and 14 and 15 were mixed with RU-5509 (a polyurethane dispersion of Stahl Europe).

Each dispersion was, with a thickness of 50 μm, sprayed on a piece of leather, while the piece of leather was pre-treated with RU-3952 (a basecoat of Stahl Europe) and the sprayed leather was dried for 3 min at 80° C. in an oven. Samples of the coated leather were subjected to a "wet-rubbing test" with a Veslic apparatus. In this test pieces of leather are rubbed with a small piece of wet felt under a pressure of 500 g. After each 250 of rubbings, until a total of 1000, the surface of the rubbed leather is checked for damages. For particular applications the coating must reach a minimum of 1000 rubbings without being damaged. The results of this test are presented in Table C.

The results in Table C show that more than 1000 rubbings without damage of the film of RU-5509 and a cross-linker are only obtained if the theoretical amount of carbodiimide functions in the polymer is more than 4 and if in addition the composition of the cross-linking polymer contains at least 5-30% by weight of a mono and/or polyisocyanate which contains a hydrophobic group, and which polyisocyanate contributes to the formation of the isocyanate functional polycarbodiimide.

TABLE C

| Cross-linking agent of Example | Number of wet-rubs of the film of RU-5509 and the cross-linking agent |
|---|---|
| 1 | Less than 1000 |
| 2 | More than 1000 |
| 3 | More than 1000 |
| 4 | More than 1000 |
| 5 | More than 1000 |
| 6 | More than 1000 |
| 7 | More than 1000 |
| 14 | Less than 1000 |
| 15 | Less than 1000 |

Example 31

Testing of the products of Examples 1, 2, 3, 4, 5, 6, 7 as cross-linking agent in a polyurethane dispersion, with the products of Examples 14 and 15 as comparative Examples.

Six % of the dispersions of Examples 1, 2, 3, 4, 5, 6, 7 and 14 and 15 were mixed with RU-3901 (a polyurethane dispersion of Stahl Europe).

Each dispersion was, with a thickness of 200 μm, applied on a sheet of glass, and the coated glass sheet was dried for 1 day at room temperature and then for 1 hr at 80° C. Samples of the dried film were subjected to an ethanol-uptake test. In this test pieces of dried and weighed film are immersed into ethanol for 1 hour and then the increase of the weight of the film is determined.

Further, the mechanical properties and the elongation of the films were measured with an MTS Synergy 200 apparatus. The results of the tests are presented in Table D.

The results show that the cross-linking with the cross-linking agent of Examples 1, 2, 3, 4, 5, 6 and 7 is stronger than with the cross-linking agent of Examples 14 and 15, which is demonstrated by the higher stress in the film which is produced when the film is being stretched and by the lower weight increase caused by the film's immersion in ethanol.

TABLE D

| Cross-linking agent of Example | Mechanical properties (MPa)[a] | | | | Elongation[b] | Weight Increase (%) |
|---|---|---|---|---|---|---|
| | M-100 | M-200 | M-300 | M-400 | | |
| 1 | 3.95 | 6.20 | 10.0 | 17.8 | 460 | 190 |
| 2 | 5.05 | 7.85 | 13.2 | — | 370 | 170 |
| 3 | 5.20 | 8.15 | 14.0 | — | 350 | 155 |
| 4 | 5.40 | 8.65 | 15.4 | — | 370 | 155 |
| 5 | 5.00 | — | — | — | 190 | 160 |
| 6 | 5.25 | 8.25 | 13.8 | — | 310 | 160 |
| 7 | 5.15 | 8.05 | — | — | 240 | 160 |
| 14 | 4.10 | 6.10 | 9.3 | 15.9 | 440 | 200 |
| 15 | 4.40 | 7.1 | — | — | 290 | 190 |

[a]MPa is megapascal ($10^6$ Nm$^{-2}$). The mechanical properties were measured on an MTS Synergy 200 apparatus. M-100, M-200, M-300 and M-400 are elastic stress values of the films when they are stretched at 100%, 200%, 300% and 400%, respectively.
[b]The elongation is the maximal elongation at the moment that the film breaks, measured on an MTS Synergy 200 apparatus.
[c]Weight increase is the percentage of weight increase of the film when it is immersed in ethanol.

The invention claimed is:

1. A method for preparing a stable aqueous polycarbodiimide dispersion to be used as cross-linking agents, comprising the steps of:
   1) reacting a first polyisocyanate and a monoisocycanate with a hydrophobic group or a second polyisocyanate with a hydrophobic group at 120-180° C. in the presence of 0.5-5% of a carbodiimide catalyst, to form an isocyanate functionalized polycarbodiimide with a mean value of 1-10 carbodiimide functions and which contains
   5-30% by weight of a monoisocysanate or a second polyisocyanate, wherein
   the hydrophobic group is a hydrocarbon containing 6-25 carbon atoms, a fluorinated hydrocarbon, a silicone functionalized hydrocarbon or a polysilicone;
   2) terminating or extending the isocyanate functionalized polycarbodiimide chain by adding:
      0.1 to 1.0 equivalent, with respect to the isocyanate functions of a first compound having a first isocyanate reactive group, the first compound comprising a hydrophilic group and one or more groups selected from amine and hydroxy functions, together with, or followed by
      capping of the remaining isocyanate functions with a second compound having a second isocyanate reactive group, the second group selected from one or more amine and hydroxy functions and, optionally, a hydrophobic group, wherein the hydrophobic group is selected from the group consisting of a hydrocarbon containing 6-25 carbon atoms, a fluorinated hydrocarbon, a silicone functionalized hydrocarbon and a polysilicone;
   3) dispersing the resulting compound in water to form an aqueous polycarbodiimide dispersion; and
   4) adjusting the pH of the aqueous polycarbodiimide dispersion to 9-14 by adding a base or a buffer to the aqueous polycarbodiimide dispersion or to the water during or after dispersing step (3).

2. The method according to claim 1 wherein, said polycarbodiimide dispersion contains 0-25% of an organic solvent which does not react with the polycarbodiimide.

3. The method according to claim 1 wherein the hydrophobic group of the monoisocysanate or second polyisocyanate, or of the second compound having a second isocyanate reactive group is a hydrocarbon which contains 6-20 carbon atoms.

4. The method according to claim 1 wherein the monoisocyanate comprising a hydrophobic group is an isocyanate containing a linear or branched alkyl, alkylene, alkyl-aryl or alkylene-aryl group with 6-25 carbon atoms.

5. The method according to claim 4, wherein the monoisocyanate comprising a hydrophobic group is selected from the group consisting of hexylisocyanate, octylisocyanate, undecylisocyanate, dodecylisocyanate, hexadecylisocyanate, octadecylisocyanate, cyclohexylisocyanate, phenylisocyanate, tolylisocyanate, and 2-heptyl-3,4-bis(9-isocyanatononyl)-1-pentylcyclohexane.

6. The method according to claim 1, wherein the monoisocysanate or second polyisocyanate comprising a hydrophobic group is an adduct of a polyisocyanate and a hydroxyl- or amine functionalized compound with a linear or branched alkyl, alkylene, alkyl-aryl or alkylene-aryl group with 6-25 carbon atoms.

7. The method according to claim 1 wherein the monoisocyanate containing a hydrophobic group is an isocyanate comprising an alkyl, an alkylene, an alkyl-aryl or an alkylene-aryl group which contains 1-50 fluorine atoms.

8. The method according to claim 7 wherein the monoisocyanate containing a hydrophobic group is fluorphenylisocyanate, fluortolylisocyanate, or 3-(trifluormethyl)phenylisocyanate.

9. The method according to claim 7 wherein the monoisocyanate or second polyisocyanate comprising a hydrophobic group is the adduct of a polyisocyanate and a hydroxyl- or amino functionalized compound with an alkyl, an alkylene, and alkyl-aryl or an alkylene-aryl group containing 1-50 fluorine atoms.

10. The method according to claim 1 wherein the monoisocyanate or second polyisocyanate comprising a hydrophobic group is the adduct of a polyisocyanate and a hydroxyl- or amine functionalized silicone, a hydroxyalkyl functionalized silicone or an aminoalkyl functionalize silicone.

11. The method according to claim 1 wherein the termination or chain extension of the isocyanate functionalized carbodiimide with the first compound and the second compound is executed during the formation of the polycarbodiimide at 120-180° C., after the formation of the polycarbodiimide at 0-120° C., or after the dispersion in water at 0-60° C.

12. The method according to claim 11 wherein the pH of the polycarbodiimide dispersion is adjusted to between 11 and 13.

13. The method according to claim 1 wherein, the carbodiimide catalyst is 1-methyl-phospholene-1-oxide.

14. The method according to claim 1 wherein the first polyisocyanate is toluene-2,4-diisocyanate, toluene-2,6-diisocyanate and mixtures thereof, diphenyl-methane-4,4-diisocyanate, 1,4-phenylenediisocyanate, dicyclo-hexylmethane-4,4'-diisocyanate, 3-isocyanatomethyl-3,5,5-trimethylcyclohexylisocyanate, 1,6-hexyldiisocyanate, 1,4-cyclohexyldiisocyanate, or norbonyldiisocyanate, or a mixture thereof.

15. The method according to claim 14 wherein the first polyisocyanate is dicyclohexylmethane-4,4'-diisocyanate.

16. The method according to claim 1 wherein the base is an alkalihydroxide selected from the group consisting of lithium hydroxide, sodium hydroxide and potassium hydroxide, or a trialkylamine, or a trialkylamine containing one or more hydroxyl functions.

17. The method according to claim 16 wherein at least a portion of the base is incorporated into the isocyanate functionalized polycarbodiimide chain by capping the polycarbodiimide chain with a dialkylaminoalkylamine or a dialkylaminoalkanol or by adding 0.01 to 0.3 equivalents, with respect to the polyisocyanate, of a tertiary amine containing a polyol or polyamine, during or after the formation of polycarbodiimide.

18. The method according to claim 1 wherein the buffer has an effective pH range of between 9 and 14.

19. The method according to claim 18 wherein the buffer is a phosphate, carbonate, tris(hydroxymethyl)-aminomethane or an aminoalkylsulfonic acid buffer.

20. The method according to claim 1 wherein the first compound is a polyethoxy mono- or diol, a polyethoxy/polypropoxy mono- or diol, a polyethoxy mono- or diamine, a polyethoxy/polypropoxy mono- or diamine, a diol or diamine containing a pendant polyalkoxy chain, an hydroxyl- or amine functionalized alkylsulfonate, or a dialkylaminoalkyl alcohol or amine, or a mixture thereof, wherein said compound has a molecular weight between 100 and 6000.

21. The method according to claim 1 wherein 0.01 to 0.3 equivalents of the first isocyanate reactive compound is added before, during or after the polyisocyanate reacting step, which first compound is selected from the group consisting of a mono or polyhydroxyalkane, a polyether based mono- or polyol, a polyester based polyol, a polycarbonate based polyol, a polycaprolatam based polyol, a mono- or polyamino-alkane, and a polyether based mono- or polyamine.

22. A coating mixture comprising a polycarbodiimide dispersion according to claim 1 as a cross-linking agent, a polymer dispersed in water and, optionally, an additional solvent wherein the polymer contains one or more carboxylic acid functions.

23. A cured material prepared by applying the coating mixture of claim 22 to a substrate, and evaporating the water and optional solvent.

24. The method according to claim 1 wherein the second compound comprises a hydrophobic group, wherein the hydrophobic group is selected from the group consisting of a hydrocarbon containing 6-25 carbon atoms, a fluorinated hydrocarbon, a silicone functionalized hydrocarbon and a polysilicone.

25. The method according to claim 1 wherein step 1 comprises bringing together the first polyisocyanate and the monoisocyanate or second polyisocyanate to form a mixture comprising the first polyisocyanate and 5-30% by weight of the monoisocyanate or second polyisocyanate.

* * * * *

UNITED STATES PATENT AND TRADEMARK OFFICE
CERTIFICATE OF CORRECTION

| | | |
|---|---|---|
| PATENT NO. | : 8,969,471 B2 | Page 1 of 1 |
| APPLICATION NO. | : 12/278275 | |
| DATED | : March 3, 2015 | |
| INVENTOR(S) | : Laurentius Cornelis Josephus Hesselmans, Marthe Hesselmans and Andries Johannes Derksen | |

It is certified that error appears in the above-identified patent and that said Letters Patent is hereby corrected as shown below:

Title Page, item (75), should read,

INVENTOR(S): Laurentius Cornelis Josephus Hesselmans, 's-Hertogenbosch (NL), deceased; Marthe Hesselmans, Utrecht (NL), legal representative; Andries Johannes Derksen, Nijmegen (NL).

Signed and Sealed this
Seventh Day of July, 2015

Michelle K. Lee
*Director of the United States Patent and Trademark Office*